Dec. 8, 1964    J. RUTKUS, JR    3,160,058
MICROFILM VIEWING APPARATUS
Filed Jan. 4, 1963    7 Sheets-Sheet 3
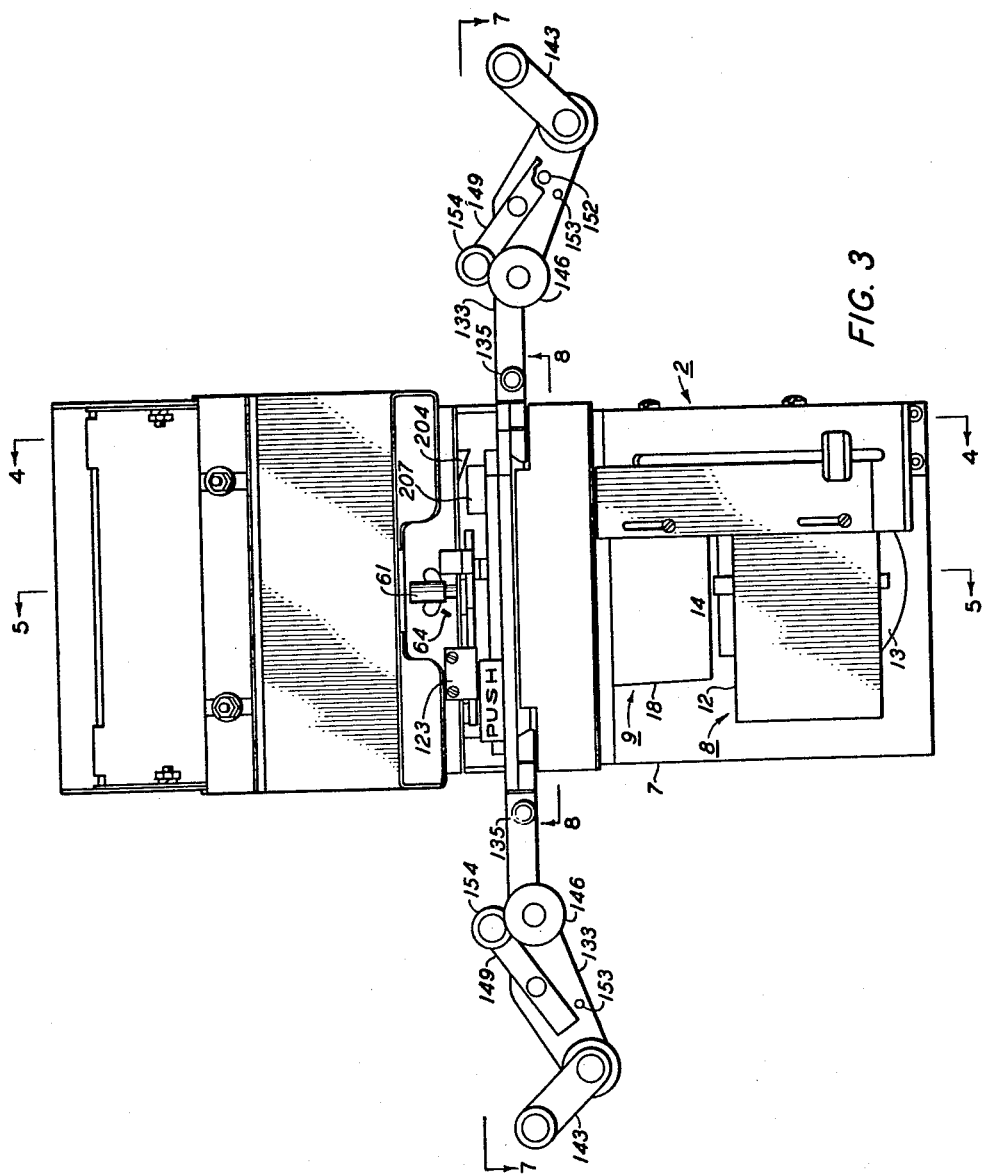
FIG. 3
INVENTOR.
JOHN RUTKUS, JR.
BY 
ATTORNEY Dec. 8, 1964  J. RUTKUS, JR  3,160,058
MICROFILM VIEWING APPARATUS
Filed Jan. 4, 1963  7 Sheets-Sheet 4
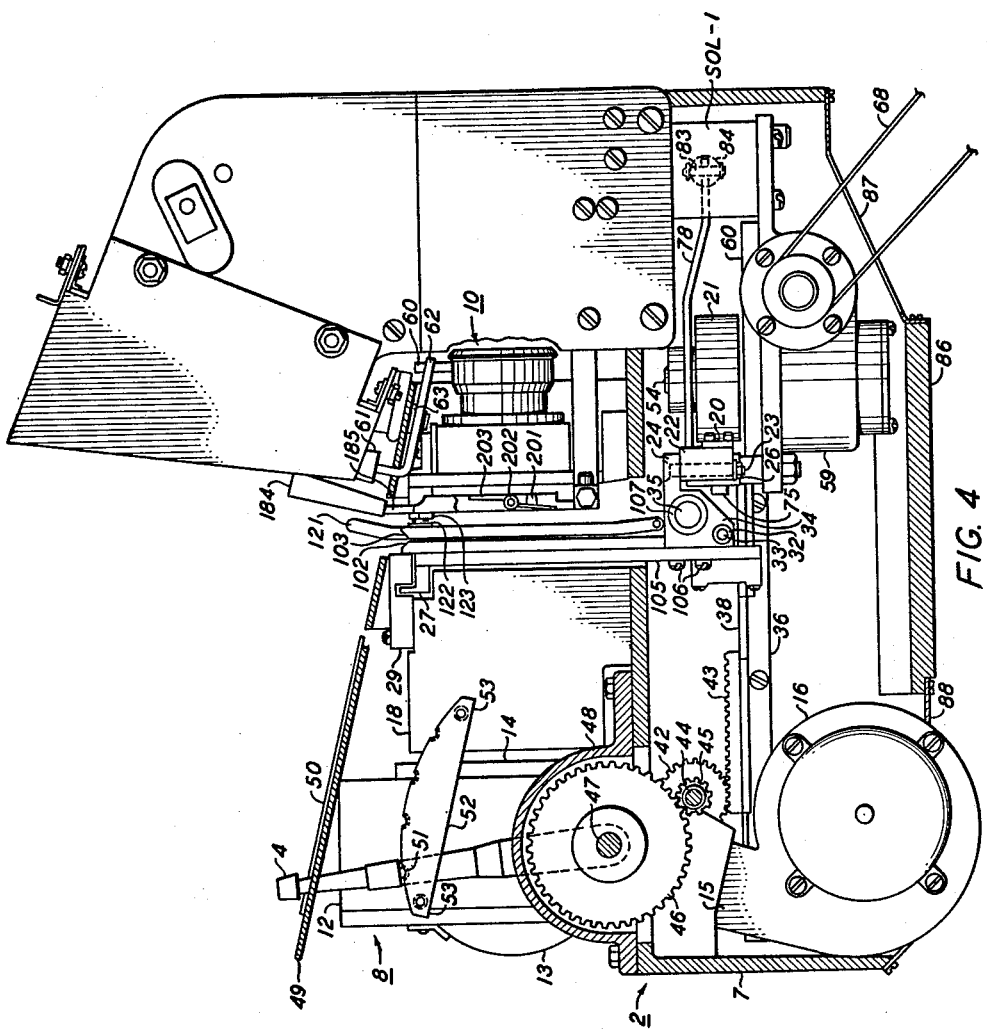
FIG. 4
INVENTOR.
JOHN RUTKUS, JR.
BY 
ATTORNEY Dec. 8, 1964
J. RUTKUS, JR
3,160,058
MICROFILM VIEWING APPARATUS
Filed Jan. 4, 1963
7 Sheets—Sheet 5
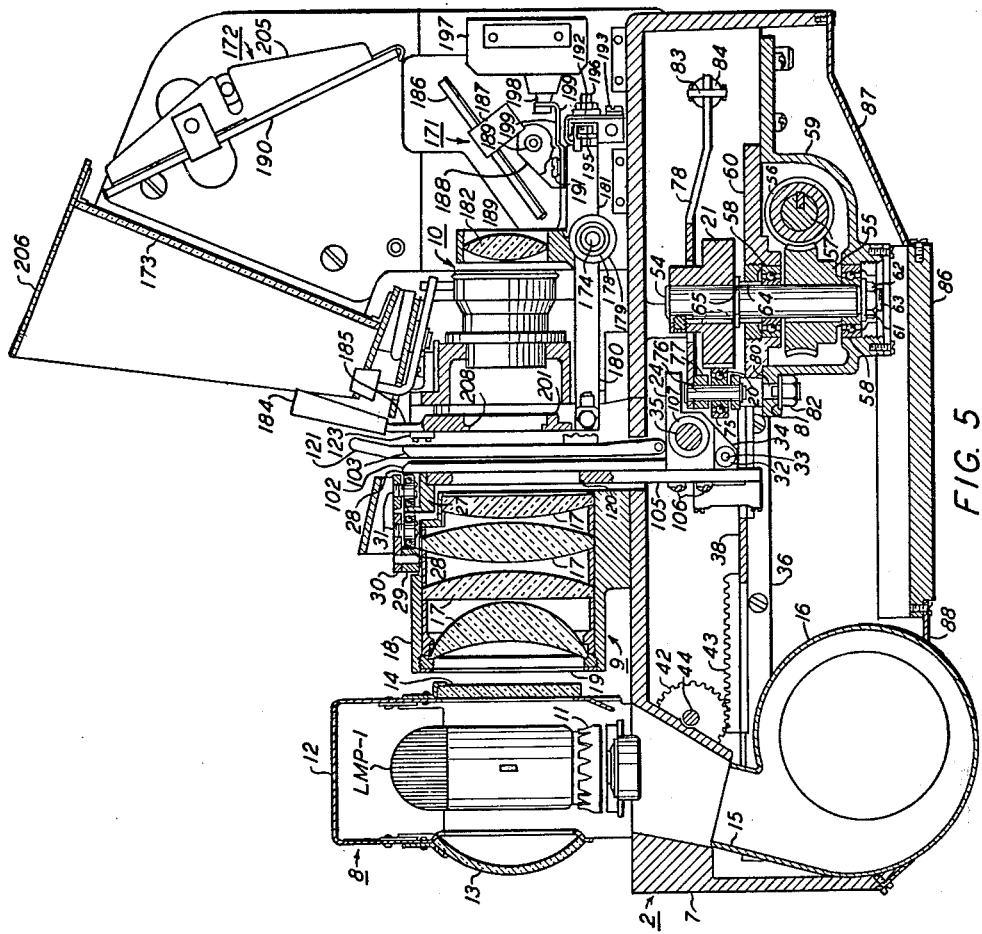
INVENTOR.
JOHN RUTKUS, JR.
BY 
ATTORNEY Dec. 8, 1964     J. RUTKUS, JR     3,160,058
MICROFILM VIEWING APPARATUS
Filed Jan. 4, 1963     7 Sheets—Sheet 6

INVENTOR.
JOHN RUTKUS, JR.
BY
ATTORNEY

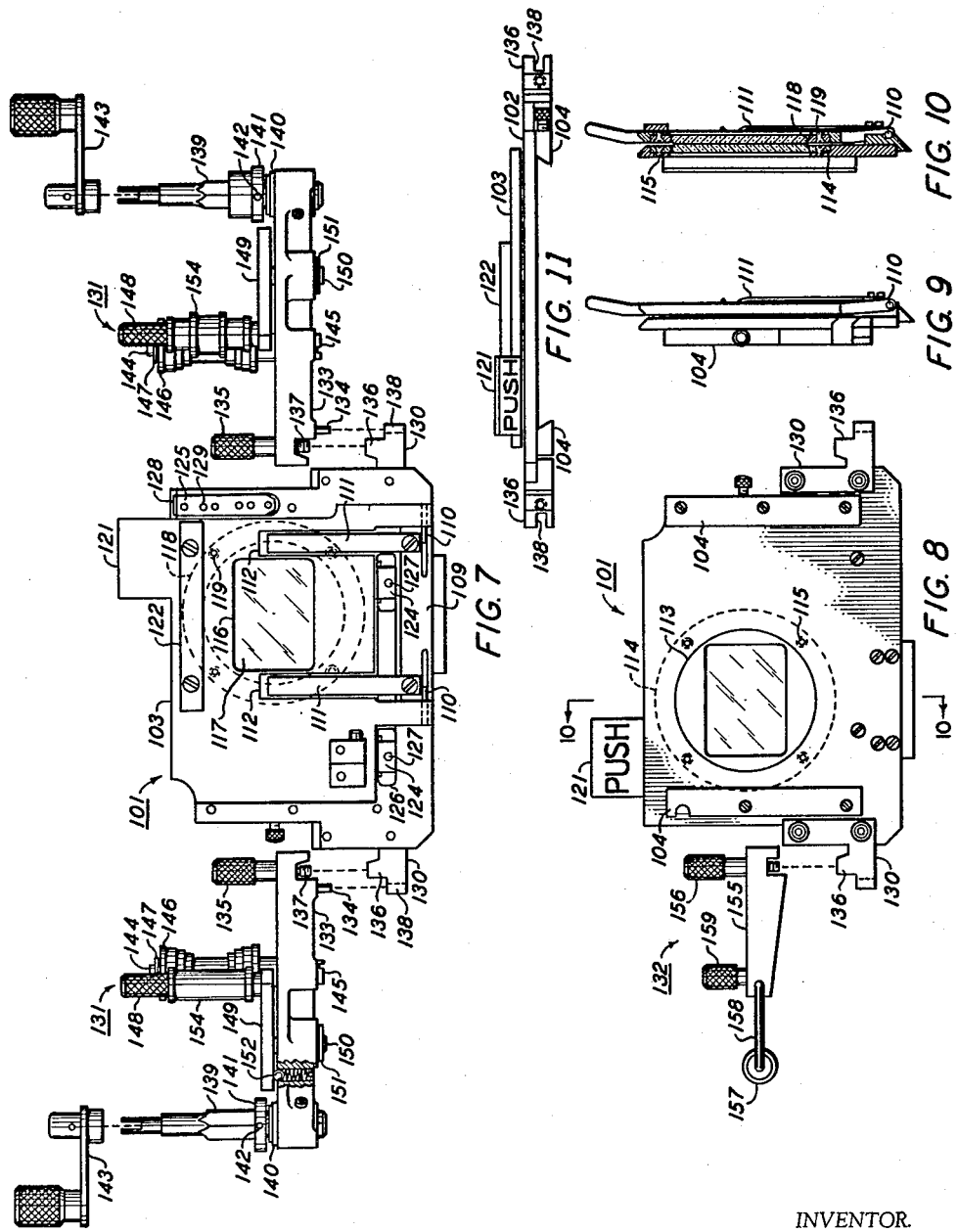

United States Patent Office 3,160,058
Patented Dec. 8, 1964

3,160,058
MICROFILM VIEWING APPARATUS
John Rutkus, Jr., Penfield, N.Y., assignor to Xerox Corporation, Rochester, N.Y., a corporation of New York
Filed Jan. 4, 1963, Ser. No. 249,445
3 Claims. (Cl. 88—24)

This invention relates to improvements in microfilm projection apparatus, and, particularly, to improvements in viewing microfilm in an optical projector of a microfilm reproducing machine.

The widely accepted use of microfilm as a means of storing information has not only increased the use of microfilm but has also increased the need for various forms of retaining, filing, and generally storing microfilm. Widely diversified uses of microfilm as a means for information storage and retrieval has resulted in a variety of methods of mounting microfilm. The most commonly used forms of microfilm are rolls of film, data processing cards, containing an aperture with microfilm having one or more images mounted therein, and transparent acetate jackets that contain multiple strips of microfilm with numerous images thereon. This diversification in the various forms of mounting microfilm has produced a need for a projection apparatus that will accept various forms of microfilm and permit visual observation of the microfilm for selection and adjustment of the particular frame desired. It is necessary that the viewing apparatus be capable of being mounted in a microfilm printing machine without interfering with the optical projection path during printing operations. Thus, the microfilm must be viewed for selection and positioning purposes while mounted in the projection apparatus and the viewing system must be removable from the light path during printing of the microfilm.

It is, threefore, the primary object of this invention to improve microfilm projection apparatus to facilitate the selection and positioning of microfilm frames in such apparatus.

It is a further object of this invention to improve microfilm projection apparatus to permit viewing of individual microfilm frames and to allow optical scanning of the microfilm frame independent of the viewing apparatus.

A further object of this invention is to improve microfilm viewing apparatus, to allow the viewing of microfilm frames in optical projectors that are used in printing copies of the microfilm image.

These and other objects of the invention are attained in the embodiment disclosed herein, by means of a slideably mounted mirror and lens which may be positioned in an optical path of a microfilm projector. The mirror and lens is readily movable out of the projection path to permit scanning of the microfilm frame by the projection apparatus. The viewing apparatus contains appropriate switching means to illuminate a projection lamp when the mirror is in a viewing position and to extinguish the projection lamp when the mirror is in a non-viewing position, and suitable actuating mechanisms to permit an operator to position the mirror and to adjust the microfilm being viewed.

For a better understanding of the invention, as well as other objects and further features thereof, reference is made to the following detailed description of the drawings, wherein:

FIG. 3 is a top view of the projector shown in FIG. 1;

FIG. 4 is a sectional view of the optical projector taken along line 4—4 of FIG. 3 with the side casings of the optical viewer in position;

FIG. 5 is a sectional view of the projector taken along line 5—5 in FIG. 3;

FIG. 7 is a view of the film holder looking in the direction indicated by line 7—7 of FIG. 3 and having roll film supports in position to be mounted thereon;

FIG. 8 is a view of the film holder looking in the direction indicated by line 8—8 in FIG. 3 and having a support arm for acetate jackets in position to be mounted thereon;

FIG. 9 is a side view of the film holder;

FIG. 10 is a sectional view of the film holder taken along line 10—10 of FIG. 8;

FIG. 11 is a top view of the film holder; and,

Figure 1:
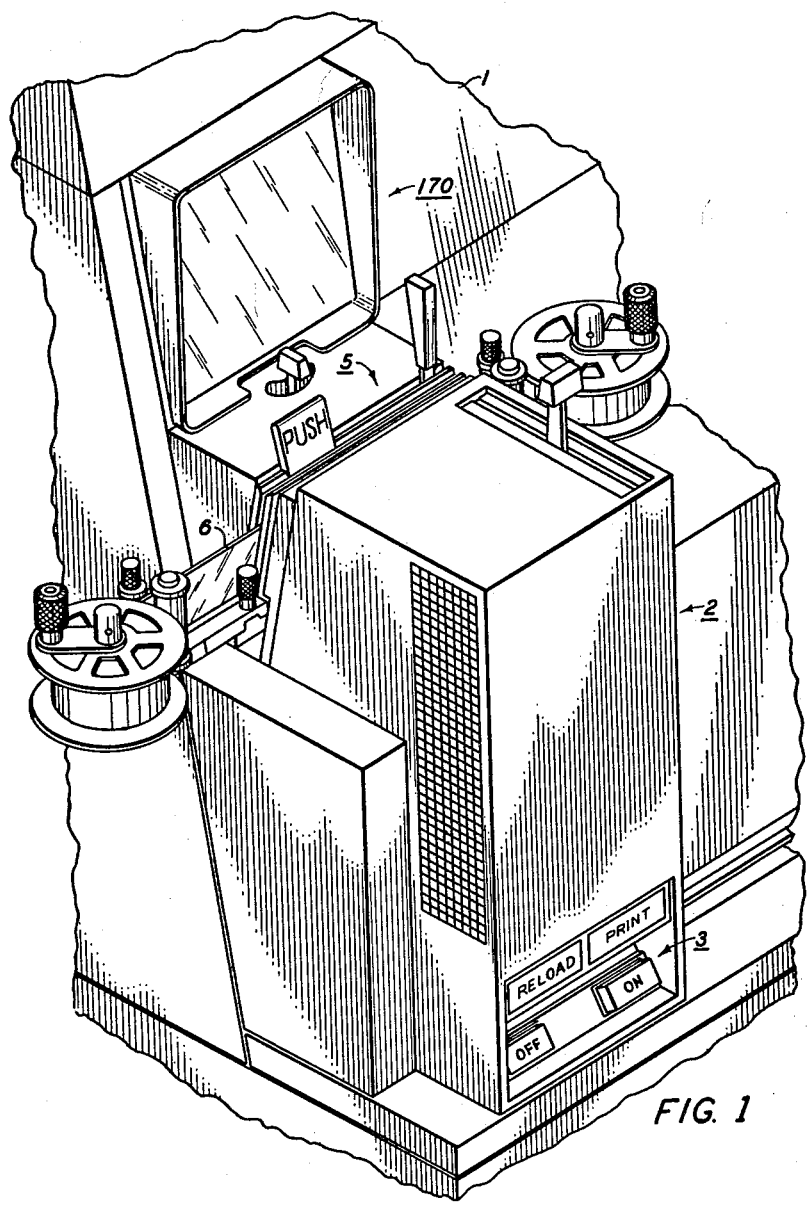
FIG. 1 is an isometric view of an optical projector containing the present invention.

Referring to the drawings, one embodiment of the invention is illustrated in use in a suitable xerographic machine. The xerographic machine is the type disclosed in copending application, Serial No. 46,463, filed August 1, 1960, now Patent No. 3,078,770, issued February 26, 1963, and is generally designated 1 in FIGS. 1 and 2.

The exposure mechanism 2 of the xerographic copier is adapted to scan an object to be reproduced and to project an enlarged flowing image of the object onto a rotating xerographic drum. In this type of projection apparatus, the scanning of the object is accomplished by means of a movable carriage, generally designated 5, supporting the objects to be reproduced and moved relative to an optical system in synchronization with the rotation of the xerographic apparatus. Specifically referring to FIGS. 1 through 6, the optical scanning mechanism or projector 2, includes a main projector casing 7, which can be formed as an integral part of the main frame of the xerographic apparatus or formed as a separate element secured to the frame of the xerographic apparatus, a lamp assembly 8, a condenser lens assembly 9, and a projector lens assembly 10 all in optical alignment with each other and with the carriage assembly 5 carrying the copy to be scanned.

In the description of the projector, when reference is made to the front of the projector, it is to be understood that this means the output end or lens end of the projector, without reference to its location on the xerographic apparatus.

The lamp assembly 8 includes a projector lamp LMP–1 positioned in a conventional lamp socket and bracket assembly 11. Both the lamp and the lamp socket assembly are partially enclosed by a lamp housing 12 having secured thereto a conventional reflector 13 and a heat filter 14.

The lamp assembly is secured to the top of the main projector casing with the lamp housing positioned over an opening therein which serves as a conduit connecting the outlet 15 of a motor driven blower unit 16 used to dissipate heat generated by the lamp LMP–1. When the projection lamp is energized, light from this lamp passes through the lens 17 of the condenser lens assembly 9 to illuminate the copy to be reproduced. The condenser lenses are suitably spaced and aligned within a condenser lens housing 18 and secured therein by lock ring 19.

Microfilm to be scanned is carried in a film holder supported in carriage assembly 5 for movement in a plane perpendicular to the axis of the condenser lens. The film is scanned to project a flowing image of the object through the projection lens assembly 10.

The carriage is driven in one direction to scan the object to be copied by means of a scan bar 20 adapted to be forced into frictional contact with a continuously rotating roller 21. The scan bar 20 is secured to a holder 22 which is pivotally secured to the carriage by means of a scan bar stud 23. Stud 23 passes through a bearing bar 24, the holder 22, and extends beyond the edge of the holder 22 to receive a retaining ring 26. The bearing bar 24 is mounted on a carriage shaft 35 which supports and guides the carriage assembly during the scanning movement.

A carriage plate 105 is fastened to the bearing bar 24 by means of screws 106. The upper end of the carriage 5 is guided in a path perpendicular to the axis of the condenser lens by means of a carriage guide 27 secured to the back side of the carriage assembly 5 between a pair of bearings 28. To support the bearings 28, there is provided a top plate 29 secured to the condenser lens housing 18. The top plate 29 contains a bearing plate 30 secured thereon. The bearings 28 are held in place by bearing retaining screws 31, threaded into the top plate 29.

To effect return of the carriage to its original starting position, there is provided a return spring 32 encircling the spring support rod 33, secured in the side walls of the projector casing. A return spring 32 is retained at one end by the wall of the projector casing and at its other end contacts a spring plate 34, secured to the carriage plate, suitable apertures being formed in the spring plate for the passage of spring support rod 33 and carriage shaft 35.

Figure 6:
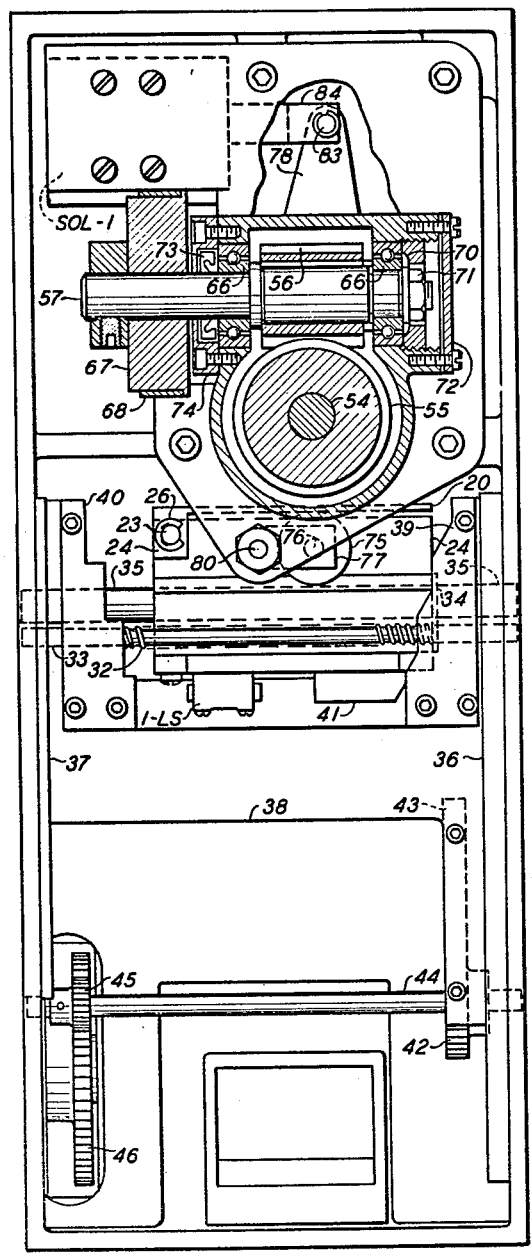
FIG. 6 is a sectional view of the projector taken along line 6—6 of FIG. 4.

To regulate the length of travel of the carriage with respect to the size of the image to be reproduced from the microfilm, there is movably positioned on guides 36 and 37 secured to the side walls of the main projector casing, a cam plate 38 having mounted on its left-hand side (right-hand side as seen in FIG. 6), a carriage return stop cam 39 and on its right-hand side (left-hand side as seen in FIG. 6) a scan limit plate 40, which are used to define the start-of-scan position and an end-of-scan position, respectively, of the carriage. The length of travel of the carriage is best controlled by varying the starting and stopping position by means of the return stop cam 39 and the scan limit plate 40. The carriage movement is controlled with respect to these elements by means of a cam follower 41, secured to the carriage plate in position to ride against the cam 39.

The length of scan of the carriage is regulated by the manually manipulated selector lever 4, used to rotate a pinion 42 which engages a rack 43 secured to the cam plate 38. Pinion 42 is secured to one end of a shaft 44 suitably journaled in the projector casing. The other end of the shaft carries a gear 45, which meshes with gear 46, secured to the shaft 47 on which the selector lever 4 is secured. The shaft 47 is suitably journaled in a selector gear housing 48.

A bracket 49, having a scale 50 thereon indicating positions of the selector lever for scanning various size image on the microfilm, is secured to the top of the projector casing and is mounted on the outside of the projector covers. In the embodiment disclosed, the projector is adapted to scan four positions. Movement of the selector lever 4 moves the rack 43 to adjust the cam plate 38 and thus the stop cam 39 and scan limit plate 40, as seen in FIG. 6. By adjusting the scan limit plate 40 the movement of the carriage is varied and various size images may be scanned. The selector lever is maintained in any of the four positions by means of a ball 51 engaging suitably positioned depressions in detent block 52, secured to the selector gear housing. The ball 51 is biased toward the detent block by a spring (not shown) retained in the selector lever. Travel of the selector is limited by means of lever stops 53 positioned at opposite ends of the detent block.

Roller 21, which drives the carriage by frictional contact with the scan bar 20, is secured to shaft 54, which carries one gear 55 meshing with worm 56 carried by drive shaft 57. Shaft 54 is journaled by bearings 58 positioned in cover 60 of gear housing 59, and in the outer wall of gear housing 59. The bearings 58 are retained by a threaded lock ring 61. Axial alignment of shaft 54 is maintained by nut 62, disposed against bearing retaining washer 63 at the threaded end of the shaft, and by bearing spacer 64 and retaining ring 65 mounted in suitable groove at the opposite end of the shaft.

Drive shaft 57, journaled by a pair of bearings 66 mounted in the gear housing 59 (FIG. 6), carries a pulley and hub assembly 67 driven by a belt 68, at a predetermined speed relative to the xerographic drum in the xerographic apparatus.

As shown in FIG. 6, worm 56 butts at one end against a shoulder of shaft 57 and at its other end against a spacer 69 interposed between the worm and a bearing 66 at the threaded end of the shaft. The axial alignment of shaft 57 is maintained by bearing retaining washer 70 forced into contact with the interface of the bearing by nut 71. Removable bearing caps 72 are secured to the gear housing to seal the nut ends of shaft 57 and 54. To eliminate dust from entering the gear housing, the drive end of shaft 57 is sealed by means of a shaft seal 73 enclosed by a seal retainer 74 suitably secured to the gear housing.

To force the scan bar 20 of the carriage into frictional contact with the roller 21 to effect a scan movement of the carriage, there is provided a pressure roller 75, here shown as a bearing, mounted on a bearing pin 76 in a bifurcated pressure lever 77. A solenoid operated lever 78 is also held on pin 76 by retaining rings 79 positioned in suitable grooves at the opposite ends of the bearing pin.

The lever 78 is pivotally secured at one end to the gear housing by a pivot stud 80 which passes through the lever 78, pressure lever 77 and the gear housing 59. The pivot stud 80 is retained therein by means of a retaining ring (not shown) at one end of the pivot stud and by means of a washer 81 and a nut 82, the latter being threaded onto the end of the pivot stud.

The lever 78 is connected at its opposite end by a connective pin 83 to the plunger 84 of the solenoid SOL–1 attached to the gear housing, whereby as the solenoid is energized, the lever is pivoted about the axis of the pivot stud 80 thereby rotating the pressure roll against the scan bar 20 to force it into frictional driving contact with the roller 21. The lever 78 has an aperture formed therein to permit it to be moved relative to the roller 21 over which it is positioned.

As the carriage is advanced by the frictional drive between the scan bar 20 and the roller 21, the limit switch 1LS attached to the carriage, contacts the end-of-scan limit plate 40, whereby the limit switch is actuated to break the circuit to the solenoid SOL–1. As the solenoid is de-energized, the contact force supplied to the scan bar is released to permit the carriage to be returned by spring 32 to the start-of-scan position.

To protect the elements of the projector mounted within the casing from dust and other foreign objects, the bottom of the projector casing is closed by means of a base plate 86, a front dust cover 87 and a rear dust cover 88.

The projector lens assembly 10 has a focusing arm 60 actuated by a lever 61 carried by lens cover 62. The lever 61 which is L-shaped, has a bifurcated end which engages the focusing arm and is pivoted about a bushing 63 connected to lens cover 62. The other end of lever 61 extends through an aperture in the lens cover 62 at a position to be actuated by an operator whereby the focus of the lens can be adjusted to compensate for film having its emulsion side either toward the front of the projector or toward the back of the projector, or for the situation where the film is in acetate jackets and the emulsion side is toward the front of the projector and the acetate jacket is between the film and the rear gate. Thus, there are three positions of the emulsion side of the film and three positions of the lever 61 are marked on the lens cover 62, as seen at 64 on FIG. 3.

In FIGS. 1 through 6, the carriage and film holder are shown assembled in the projector, however, the film holder is separable from the carriage and removable from the projector and is shown in detail in FIGS. 7 through 11. The carriage assembly 5 contains a film holder 101 consisting of a rear gate 102 and a front gate 103. Attached to rear gate 102 are dovetailed members 104 which mate with vertical dovetailed guides on an apertured carriage plate 105. As seen in FIGS. 4 and 5, the carriage plate 105 is movably supported by a bearing 24 and is secured thereto by means of screws 106. The bearing 24 rides on the carriage shaft 35 secured in the side walls of the projector casing, the bearing being suitably journaled on the shaft by means of bushing 107. The upper end of the carriage plate 105 is guided in a path perpendicular to the axis of the condenser lens by means of a carriage guide 27 secured to the backside of the carriage plate and extending between bearings 28.

Secured to rear gate 102 is a block member 109 containing a pair of pivot pins 110 and a pair of leaf springs 111. The pivot pins 110 are journaled in the front gate 103 of the film holder, and the leaf springs fit grooves 112 in the front side of the front gate 103. Front gate 103 is held in position against rear gear 102 by springs 111 and pivots about pins 110.

A circular piece of glass 112 is held in an aperture 113 or rear gate 102 by means of a glass retaining ring 114 and screws 115. A rectangular aperture 116 in the front gate 103 contains a glass window 117 secured in the front plate by means of retaining ring 118 and screws 119. Front gate 103 and rear gate 102 are held in pressing surface contact by leaf springs 111 and are separable by being pivoted about pins 110 against the action of leaf springs 111. The apertures 113 and 116 are aligned with each other to provide a light path through the film holder. Both of the apertures are also aligned with the condenser lens 17, the projector lens 10 and the large aperture 120 in the carriage plate 105 seen in FIG. 5. Therefore, with the film holder assembly 101 mounted in the carriage assembly 5, on the carriage plate 105, an optical path is provided between lamp LMP–1 and the output end of the projector lens assembly 10.

When the assembled film holder 101 is inserted into the projector unit so that the dovetailed guides 104 mesh with carriage plate 105 the film holder is in an operational position for the insertion of microfilm therein. A tab 121 on front gate 103 containing the designation PUSH provides a means for the operator to separate the front gate 103 and the rear gate 102. When the tab 121 is pushed forward, separating the two gates, a magnetic bar 122 secured to the front of the front gate 103, contacts a permanent magnet 123, mounted on the projector frame. Magnet 123 holds the front gate 103 away from the rear gate 102 against the action of leaf springs 111. Microfilm may now be inserted between the front gate and the rear gate and when properly positioned may be clamped in place by pulling the tab 121 away from the magnet 123.

The apparatus is adapted to handle all forms of microfilm specifically individual frames of microfilm mounted in apertures of data processing cards, strips of microfilm mounted in clear acetate jackets, and rolls of microfilm. The data processing cards containing an aperture with a microfilm frame mounted therein is referred to herein as an aperture card, the strip microfilm mounted in the clear acetate jackets is referred to as acetate jackets, and the rolls of microfilm are referred to as roll film.

When reproductions are to be made from aperture cards, there are positioning stops mounted in the film holder 101 to provide proper alignment of the microfilm in the aperture card with the windowed apertures 116 and 113 in front gate 103 and rear gate 102, respectively. The positioning stops are seen in FIGS. 7 and 8 and consist of a pair of permanent lower, or vertical, stops 124 and the horizontal stop 125. The vertical stops 124 are mounted in a slot 126 in the rear gate 102 and extend beyond the surface of the rear gate 102 so that an aperture card placed between gates 102 and 103 will abut the stops 124. The stops 124 are removably secured to the rear gate 102 by screws 127, however, they are not normally removed during the transition from aperture cards to either roll film or acetate jackets. The horizontal stop 125 is mounted in a slot 128 also in rear gate 102. The stop 125 is secured to the rear gate by means of screw 129, the slot 128 has an aperture which is smaller than the slot that extends through the back plate 102, and the stop 125 has an undercut portion on each end so that when the stop 125 is attached in the slot 128 the undercut portion is flush with the surface of the rear gate 102 and the stop portion extends beyond the surface of rear gate 102 providing a horizontal stop for the aperture card. When either roll film or acetate jackets are to be used, the screw 129 may be removed and the stop 125 reversed so that the undercut portion is now against the bottom of the stop and the stopping portion extends through the aperture. Thus, the back stop 125 is flush with the surface of rear gate 102 providing a smooth surface for the adjustment of the roll film or the acetate jackets. With both stops 124 and 125 in a position where they will extend beyond the surface of rear gate 102, an aperture card may be placed between the plate holders 102 and 103 and abutted against the stops 124 and 125. The microfilm mounted in the aperture of the aperture card will now coincide with the apertures in the rear gate 102 and the front gate 103, providing an optical path from lamp LMP–1 through the microfilm to the projector lens assembly.

When acetate jackets or roll microfilm are to be used, the horizontal stop 125 is inverted by removing screw 129 and placing the stop 125 so that the back portion is flush with the surface of rear gate 102. Also, if larger size acetate jackets are to be used, such as 5 inch by 7 inch, then the vertical stops 124 are also removed and reversed so that they are flush with the surface of rear gate 102.

Securely attached to both sides of back plate 102 are a pair of support brackets 130. The support brackets 130 are adapted to receive and hold either a roll film mounting assembly 131 or an acetate jacket support assembly 132. The roll film mounting assembly 131 is shown in FIG. 7 in a position to be mounted on the support brackets 130, and the acetate jacket support assembly is shown in FIG. 8 in a position to be mounted on one of the support brackets 130, and the acetate jacket support assembly is shown in FIG. 8 in a position to be mounted on one of the support brackets 130. It should be noted that an acetate jacket support assembly is provided for both sides of the film holder, even though only one such assembly is shown in FIG. 8.

The roll film mounting bracket 131 consists of a support arm 133, a positioning pin 134 and a knurled fastening screw 135. One end of the support arm 133 is shaped to provide a mating support connection with the support bracket 130, to provide a secure seating position between the bracket and the support arm. When the support arm 133 is placed on the bracket 130, a dog 136 on the bracket 130 mates with an undercut portion 137 on the support arm 133. The positioning pin 134 extends downward into a slot 138 in the bracket properly aligning the support arm. The fastening screw 135 is manually screwed into a tapped hole in bracket 130. The support arms 133 are now securely positioned and aligned relative to the film holder assembly 101.

On the outer end of each support arm 133 there is a spindle 139 properly sized to receive a film reel. The spindles 139 are rotatively mounted in bearings 140 and contain a reel positioning collar 141 secured thereto by set screw 142. The top of the spindle 139 is notched to mate with a hand crank 143. The spindle 139 containing a reel of film may be rotated by hand crank 143 to take up the film on another reel positioned on the opposite spindle. Both spindles are freely rotatable in either direction to permit the film to be moved in either direction. The support arm 133 also contains two shafts containing rollers adapted to align the film with the apertures in the film holder 101. One shaft 144 is secured to the support arm 133 by screw 145 and has mounted thereon a guide roll 146 with a step diameter corresponding to either the width of 16 mm. or 35 mm. film. The guide roll 146 is retained on the shaft 144 by means of a split ring 147. A second shaft 148 containing a knurled head and a threaded end which mates with a tapped hole in a pivoted bar 149. The bar 149 is pivoted about a pin 150 extending through the support arm 133 and held therein by a split ring 151. The bar 149 is adjustable to three positions and is secured in each of the three positions by a spring loaded detent ball 152 mounted internally off the support arm 133. The movement of arm 145 is limited in one direction by contacting the guide roll 146 and in the other direction by a limiting pin 153, as seen in FIG. 3. When the shaft 148 is removed from the bar 149, either of two guide rolls 154 are inserted on the shaft and the shaft is replaced on the bar 149. Each of the guide rolls 154 contains an undercut center and is adapted to have the larger outer diameters mate with a corresponding pair of the step diameters on guide roll 146. Thus, when 35 mm. film is used, the guide roll 154 illustrated on the left-hand side of FIG. 7 is used so that the top and bottom edge of the roll film is caught between the two mating diameters of guide rolls 154 and 146. When 16 mm. film is used, the guide roll 154 illustrated at the right-hand side of FIG. 7, is placed on shaft 148 and the top and bottom edges of the 16 mm. film will be supported by the mating diameters of the guide rolls 154 and 146. In both cases, the center of the film is not touched, merely the outer edges, and both guide rolls are freely rotatable so that as the film is taken up on one reel it is held in a taut aligned position by the guide rolls as it passes between the front and rear gates in film holder 101.

When reproductions are desired from strips of microfilm mounted in acetate jackets, the entire jacket is inserted between the front and rear gates and positioned so that the desired image appears in the apertures 113 and 116 in the rear and front gate, respectively. Since there are parallel strips of film in each acetate jacket and several images in each strip, the acetate jacket must be positioned both vertically and horizontally for proper alignment of the desired image. When the desired image is properly aligned in the viewing screen, as discussed below, the front gate is released from the magnet 123, clamping the acetate jacket in position. However, since the carriage moves during the scanning operation there is a possibility that the acetate jacket will also move from the position in which it is originally set. Therefore, an additional support for the end of the acetate jacket extending out of the card holder assembly is provided by means of a support arm 155, as seen in FIG. 8. The support arm 155 has a configuration at one end identical with the support arm 133 of the roll film holder, that is, one end is notched to receive dog 136 of the support bracket 130 and contains a fastening screw 156 to secure the support arm 155 to the support bracket 130. The outer end of the support arm 155 contains a small coiled spring 157 mounted on a rotatable arm 158, the arm 158 extends through the end of support arm 155 and is pivotable in a vertical direction to change the height of the spring 157. The spring 157 and the arm 158 may be locked in position by a knurled set screw 159. When the acetate jacket is properly positioned in the card holder, the set screw 159 is loosened and the spring 157 is moved upward so that the acetate jacket extends between the coils of spring 157 and is supported thereby. Set screw 159 is then tightened and the acetate jacket is held in position at its outer end by the coiled spring 157.

Figure 2:
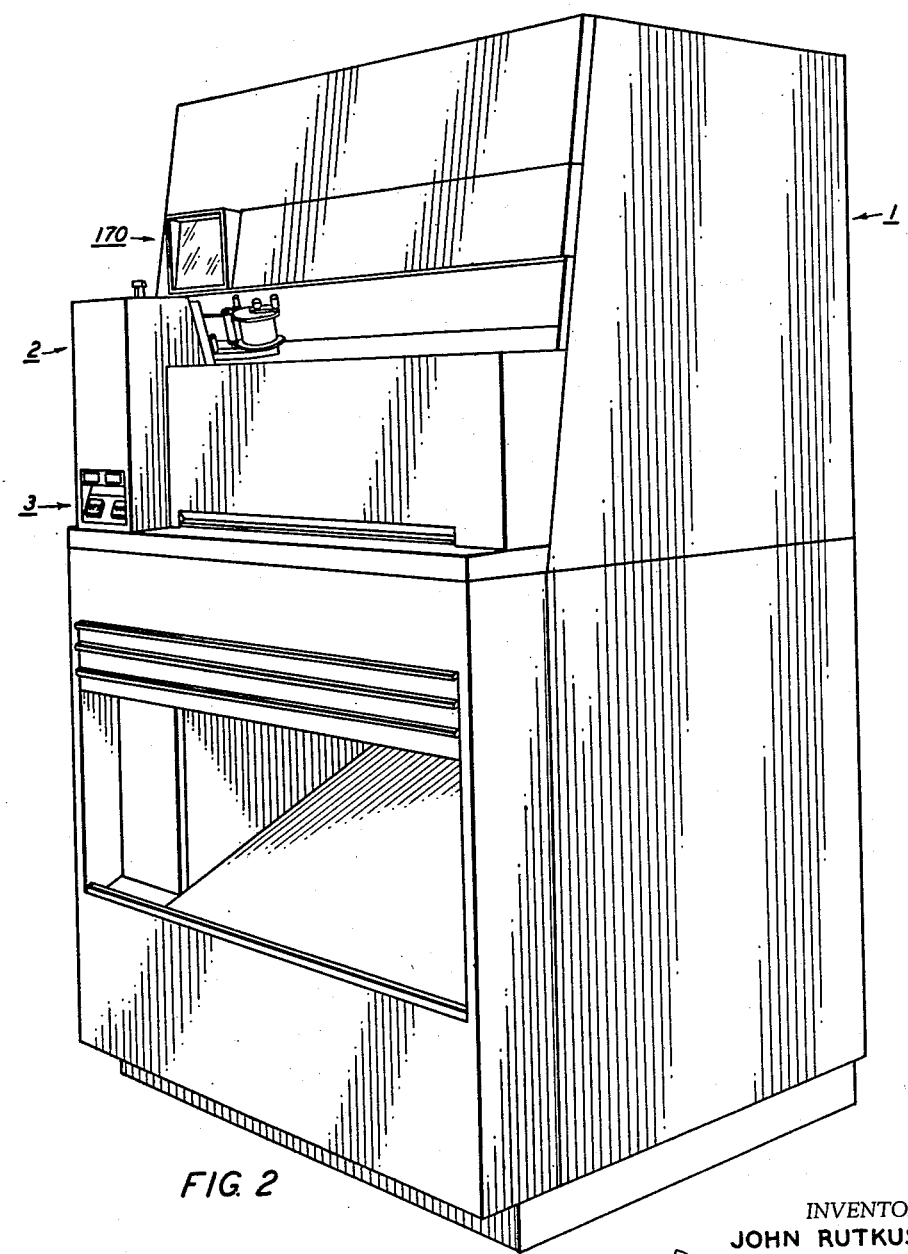
FIG. 2 is an isometric view of an automatic xerographic machine suitable for use with an optical projector containing the present invention.
Figure 12:
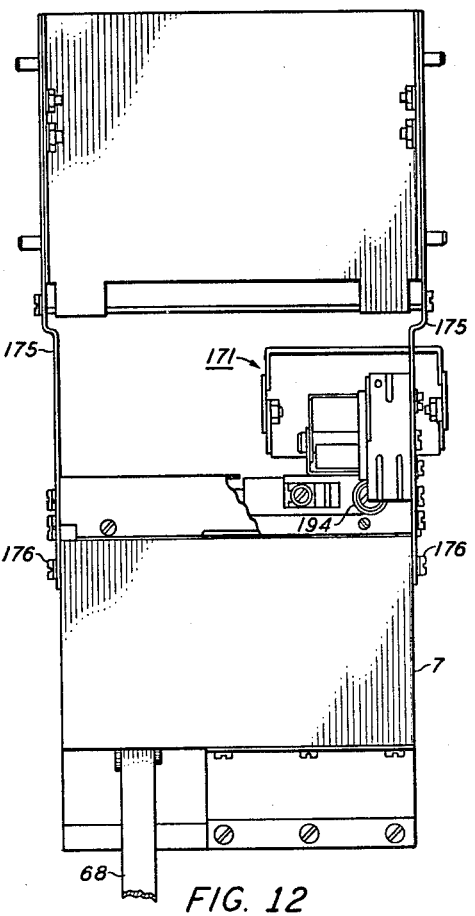
FIG. 12 is a rear view of the optical viewer shown in FIG. 5.

To provide proper selection and positioning of the image to be reproduced, a viewing and positioning screen generally indicated at 170 in FIGS. 1 and 2, has been provided immediately above the projector 2. When an image is to be reproduced from a roll of microfilm or an acetate jacket the operator places the roll film or acetate jacket in the film holder 101, as previously described. The image is viewed in the viewing assembly 170 and minor adjustments for centering purposes are made by the operator. The film holder assembly 101 is closed, clamping the microfilm in position. Details of the operation and apparatus of the viewing assembly 170 are seen more clearly in FIGS. 5 and 12.

When a light image of the copy being reproduced passes through the projector lens assembly 10, it normally continues on into the body of the machine to a larger mirror assembly, not shown herein, but completely illustrated and described in the previously mentioned copending application, Serial No. 46,463, now Patent No. 3,078,770, issued February 26, 1963. However, to view the image on the viewing screen, a slideably mounted mirror assembly, generally indicated as 171 in FIG. 5, is positioned in front of the projector lens assembly. A light image of the microfilm is then reflected from the mirror assembly 171 upward onto a large mirror assembly 172 and is again reflected onto the surface of a ground glass viewing platen 173.

The mirror assembly 171 is slideably mounted on a shaft 174, supported in side walls 175 of the viewing assembly 170. The walls 175 are attached to the projector casing 7 by means of screws 176 and encloses the mirror assembly 171, the large mirror assembly 172 and the ground glass viewing platen 173. Mounted on the shaft 174 is a viewer carriage 178 slideably mounted by means of bearing 179. The viewer carriage 178 consists of an adjustment arm 180 and a mirror assembly arm 181. Also mounted on the viewer carriage 178 directly in front of the mirror 171 is a lens 182. The lens 182 is held in a lens retaining block 183 formed as an integral part of the viewer carriage 178.

A positioning knob 184 is attached to the adjustment arm 180 by means of positioning lever 185 and movable plate 201. The positioning arm 184, the positioning lever 185 and the movable plate 201 are located directly behind the card holder assembly 101 and movement of the knob in a direction perpendicular to the light path through the projector produces a corresponding movement of the viewer carriage 178 along shaft 174. Thus, the lens 182 and the mirror assembly 171 may be moved into or out of the light path of the projector lens assembly 10.

The mirror assembly 171 consists of a small mirror 186 secured in a mirror frame 187 which is pivotally attached to bracket 188 by means of bolts 189. The mirror 186 and the frame 187 may be rotated about bolts 189 for proper adjustment of the reflected image onto a large mirror 190. The bracket 188 is secured to the mirror assembly arm 181 of the viewer carriage 178 by means of screws 191 and the entire mirror assembly 171 moves with the viewer carriage 178, in a path parallel to the longitudinal axis of the shaft 174. To the rear of the mirror assembly arm 181, there is a guide rail 192 secured to the frame 7 by means of screws 193. A guide roller 194, rotatively secured to the mirror assembly arm 181, rides in the guide rail 192 to ensure proper alignment and movement of the mirror assemly 171. A small detent block 195 is secured to the back of the mirror assembly arm 181 and extends into the guide rail 192. A set screw 196, mounted on the guide rail 192, contacts detent block 195 when the mirror assembly 171 is in a non-viewing position and thus secures the mirror assembly in that position preventing movements and possible interference with the light path of the image being reproduced.

An electrical switch 197 is mounted on the side wall 175 and has a contact 198 to control operation of the projection lamp LMP-1 during the viewing operation. A small contact arm 199 extending out of the bracket 188 actuates the switch contact 198 turning the lamp LMP-1 off when the mirror assembly 171 has been moved to a non-viewing position, and releases the contact 198 turning the lamp LMP-1 on when the mirror assembly 171 is moved into a viewing position.

To view an image on the viewing screen 173, the positioning knob 184 is moved to the extreme right as viewed by an operator looking into the viewing platen 173. The positioning lever 185, as seen in FIG. 4, is attached to a movable plate 201 by means of pin 202 and held against plate 201 by torsion spring 203. The plate 201 is secured to the adjustment arm 180 and produces movement of the adjustment arm 180 when a positioning knob 184 is moved in either direction.

To view an image on the viewing platen 173, the adjustment knob 184 is moved to the right and either pulled toward the operator against the action of spring 203 or is forced towards the operator by riding up on the inclined surface of stop 204. When the knob 184 is released, it is caught on the positioning knob stop 204, as seen in FIG. 3. The movable plate 201 is then out of the optical path of the projector and the viewer carriage 178 is moved along shaft 174 to a point where lens 182 is directly in front of the projector lens assembly 10. The mirror assembly 171 is also in front of the projector lens assembly 10, and the contact arm 199 has released contact 198 of switch 197 illuminating lamp LMP-1. Light from lamp LMP-1 passes through the condenser lens assembly 9, the apertures in the carriage plate 105, and the film holder 101, passing through the microfilm mounted in film holder 101 and through the projector lens 10, the lens 182 onto the mirror 186. The light image from the microfilm is reflected from mirror 186 upward to the large mirror 190 mounted on mirror frame 205. The mirror frame 205 is adjustably connected to the side walls 175 of the mirror housing, and is adjustable to reflect the image from mirror 190 onto the surface of the ground glass viewing platen 173. A viewing screen shield 206 is provided around the viewing glass 173 to shield the viewing surface from the stray light. The microfilm may be adjusted in the film holder 101 so that the image is properly aligned on the viewing glass 173. The microfilm is clamped into place by releasing the front gate 103 from the magnetic catch 123 and the positioning knob 184 is moved toward the operator releasing it from its positioning stop 204. When the positioning knob 184 is moved to the right for viewing purposes, a cam 207 mounted on the front of the front gate 203 is contacted by the movable plate 201 and the entire carriage assembly 5 is also moved to the right against the action of spring 32, as seen in FIG. 6. This movement assures proper alignment of all the apertures in the carriage assembly 5 for purposes of viewing. However, when the positioning knob 184 is released from the positioning stop 204, spring 32 moves the entire carriage assembly back to the start-of-scan position and it carries with it the movable plate 201 and the entire viewer carriage 178. The knob 184 is then moved a short distance to the left, so that a scanning slot 208, in movable plate 201, is in position to scan the image on the microfilm as the carriage 5 and the film are moved through a scanning cycle. If desired, the movable plate 201 may be spring loaded to return to a start-of-scan position after it is released from positioning stop 204. The slot 208 is a vertical slot, which remains in a stationary position while the carriage assembly 5 is carrying the microfilm across the light path from lamp LMP-1 through the condenser lens assembly 9. The image on the microfilm is progressively scanned and passed through the slot 208 to the projector lens 10 and past the lens 82 and the mirror assembly 171, which are now out of the optical path.

While the present invention, as to its objects and advantages as described herein, has been carried out in a specific embodiment thereof, it is not desired to be limited thereby, but it is intended to cover the invention broadly within the spirit and scope of the appended claims.

What is claimed is:
1. A microfilm viewer for use in an optical projector of a microfilm reproducing apparatus including
    microfilm support means for holding microfilm in a light path of an optical projector,
    a viewing screen for displaying a microfilm image,
    a shaft mounted substantially perpendicular to the light path but not intersecting the light path,
    a carriage slideably mounted on the shaft to be movable along the length thereof,
    a mirror and lens supported on said carriage and intersecting the light path of the projector when the carriage is at a first end of the shaft,
    said shaft being of sufficient length that the mirror and lens do not intersect the light path of the projector when the carriage is at a second end of the shaft,
    said mirror being positioned on the carriage to reflect a light image of the microfilm into an optical path terminating on said screen,
    and a lever attached to said carriage to produce movement of the carriage along the shaft,
    said lever engaging the microfilm support means so that movement of the carriage by the lever from said second end to the first end will produce movement of the microfilm support means to a position wherein microfilm in said support means will be centered in the light path of the optical projector.
2. A microfilm viewer for use in an optical projector of a microfilm reproducing apparatus including
    microfilm support means for holding microfilm in a light path of an optical projector,
    a viewing screen for displaying a microfilm image,
    a shaft mounted substantially perpendicular to the light path but not intersecting the light path,
    a carrier slideably mounted on the shaft to be movable along the length thereof,
    a mirror and lens supported on said carriage and intersecting the light path of the projector when the carriage is at a first end of the shaft,
    said shaft being of sufficient length that the mirror and lens do not intersect the light path of the projector when the carriage is at a second end of the shaft,
    said mirror being positioned on the carriage to reflect a light image of the microfilm into an optical path terminating on said screen,
    a lever attached to said carriage to produce movement of the carriage along the shaft,
    said lever engaging the microfilm support means so that movement of the carriage by the lever from said second end to the first end will produce movement of the microfilm support means to a position wherein microfilm in said support means will be centered in the light path of the optical projector,
    lever retaining means to hold said lever in a position wherein the mirror intersects the light path of the optical projector,
    and biasing means to move said carriage from the first end of said shaft to the second end when said lever is disengaged from the retaining means.
3. A microfilm viewer for use in an optical projector of a microfilm reproducing apparatus including
    microfilm support means for holding microfilm in a light path of an optical projector,
    a viewing screen for displaying a microfilm image, a shaft mounted substantially perpendicular to the light path but not intersecting the light path, a carriage slideably mounted on the shaft to be movable along the length thereof, a mirror supported on said carriage and intersecting the light path of the projector when the carriage is at a first end of the shaft, said shaft being of sufficient length that the mirror does not intersect the light path of the projector when the carriage is at a second end of the shaft, said mirror being positioned on the carriage to reflect a light image of the microfilm into an optical path terminating on said screen, and a lever attached to said carriage to produce movement of the carriage along the shaft, said lever engaging the microfilm support means so that movement of the carriage by the lever from said second end to the first end will produce movement of the microfilm support means to a position wherein microfilm in said support means will be centered in the light path of the optical projector, lever retaining means to hold said lever in a position wherein the mirror intercepts the light path of the optical projector, biasing means to move said carriage from the first end of said shaft to the second end when said lever is disengaged from the retaining means, and an electrical switching means to automatically illuminate a lamp in the optical projector when the carriage is at the first end of said shaft and to extinguish the lamp when the carriage is at the second end.

References Cited in the file of this patent
UNITED STATES PATENTS

| | | |
|---|---|---|
| 2,564,440 | Maser et al | Aug. 14, 1951 |
| 3,094,036 | Benson | June 18, 1963 |